J. A. SCHMITZ.
NUT LOCK.
APPLICATION FILED NOV. 29, 1911.
1,046,869.
Patented Dec. 10, 1912.
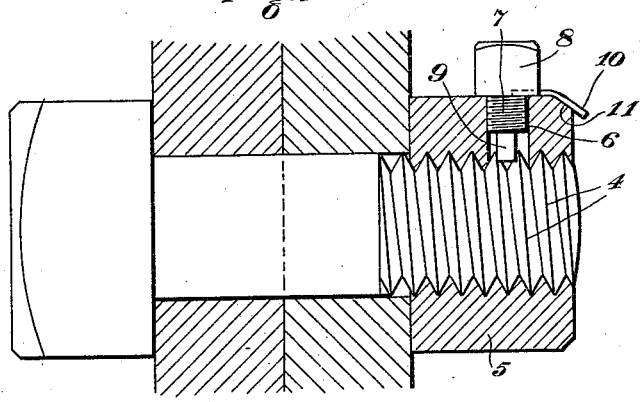
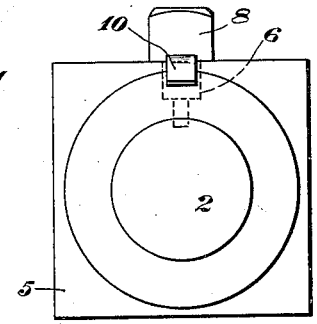
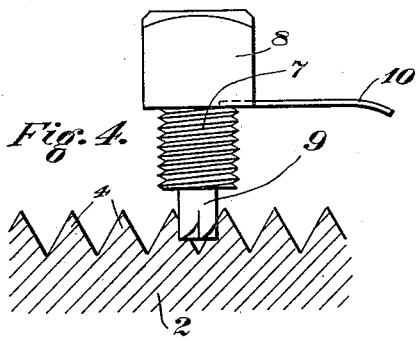
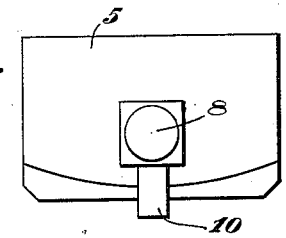
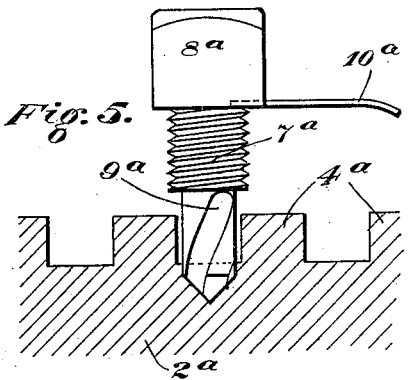
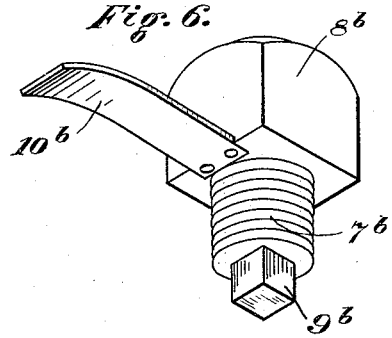
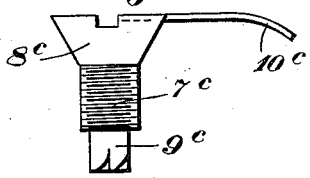
Witnesses:
Inventor:
J. Adolph Schmitz
by C. M. Clarke
his Attorney

UNITED STATES PATENT OFFICE.

JAKOB ADOLPH SCHMITZ, OF WASHINGTON, PENNSYLVANIA.

NUT-LOCK.

1,046,869.  Specification of Letters Patent.  Patented Dec. 10, 1912.

Application filed November 29, 1911. Serial No. 663,136.

*To all whom it may concern:*

Be it known that I, JAKOB ADOLPH SCHMITZ, a citizen of the United States, residing at Washington, in the county of Washington and State of Pennsylvania, have invented certain new and useful Improvements in Nut-Locks, of which the following is a specification.

My invention consists of an improvement in nut locks.

It consists of a screw having a drill terminal inserted in a threaded socket in the side of the nut, and so located that the drill will cut into the bolt on which the nut is mounted directly between two adjacent threads and will form an interlocking socket to fixedly hold the nut against turning.

The device is illustrated in the accompanying drawings, in which—

Figure 1 is a sectional view showing the device in operative position. Fig. 2 is an end view of the nut. Fig. 3 is a plan view of the nut. Fig. 4 is an enlarged detail view showing the threads of the bolt in section. Fig. 5 is a similar view showing the locking device provided with a twist drill and applied to a square thread bolt. Fig. 6 is a perspective detail view showing the securing screw provided with a square terminal drill. Fig. 7 is a detail view showing the locking device provided with a counter-sunk head.

The invention is designed to provide a locking device for an ordinary bolt and nut which will cut a holding socket in the bolt exactly between two adjacent threads at any position of the nut when tightened on the bolt, without impairing the bolt threads.

In the drawings, 2 is the bolt having the usual head 3 and threads 4. The nut 5 may be either square or hexagon and is provided with a tapped socket 6 through one of its sides at a point exactly opposite the center of the nut thread. Such point, of course, will correspond to a position exactly between the threads of the bolt on which the nut is screwed at any position the nut may assume when screwed up tightly to position. Into said socket 6 is screwed the small locking screw 7 by its head 8, and the screw 7 is provided at its inner end with a small drill point 9. The drill point may be of any suitable construction and is intended to cut its way between the sides of two adjacent threads 4 either partly or entirely to the root of the thread by merely turning the screw 7. Preferably the cut is made for a portion only of the depth of the thread so that space will be left, if desired, for the drill cuttings.

In order to fixedly lock the screw 7 itself in position, when screwed down tight, it is provided with a locking spring 10 of any suitable form, adapted to insert itself into a receiving socket 11 in the side of the nut. The screw is suitably threaded and the spring so located, that it will register with the socket when the screw 7 is at about the desired position.

As shown, the spring 10 preferably projects somewhat beyond the end of the nut so that it may be easily raised out of the socket to permit loosening of the screw 7, when it is desired to take the nut 5 off of the bolt, or to tighten it farther on the threads 4 to a new position. In such case the screw 7 is reversed and then screwed down again, making a new cut and socket at a different position on the bolt threads. By reason of the socket being always cut between the threads, their crowns are left unimpaired so that the efficiency of the bolt and nut is always at a maximum.

In Fig. 4 the device is illustrated on a larger scale, showing the bolt threads in section and illustrating the cutting terminal of the drill point 9 and its action in the manner above described.

In Fig. 5 I show the application of the invention to a bolt having square threads $4^a$ and the drill inserted between them to cut a socket into the recessed face of the bolt. The drill $9^a$, in such application of the invention, may be a twist drill, as shown, having a tapered terminal and spiral cutting edges with ample clearance space between.

In Fig. 6 the screw $7^b$ is provided with a square terminal $9^b$ the edges of which have a diagonal diameter somewhat less than the diameter of the screw $7^b$ and are adapted to cut a socket through the inclined faces of the ordinary V screw with facility to form a holding socket engagement. The spring $10^b$ is secured to the under side of the head $8^b$ in any suitable manner, either by inserting and securing it in a suitable socket in the under side of the head, or by embracing the threaded screw portion 7, as in the other constructions.

In Fig. 7 I show a screw $7^c$ and its drill terminal $9^c$ with a head $8^c$ adapted to be turned by a screw driver and to be seated in a countersunk recess in the side of the nut providing a flush surface. The spring 10ᶜ is secured on the top of the screw head or in any other suitable manner.

With either form or arrangement illustrated, the device will operate to securely hold the nut 5 against reversal or loosening while it provides for easily and quickly re-adjusting the nut on the bolt as desired.

It will be understood, of course, that the drill terminal of the locking screw is of hardened steel, and capable of cutting through the metal of the bolt threads.

The device is applicable to many kinds of nuts and bolts, and is especially suited to that class of machinery and construction subject to much vibration or movement, and will operate when set to continuously hold the nut in its original position.

The invention may be changed or varied in different details by the skilled mechanic without departure from the scope of the following claims.

What I claim is:

1. A nut having a threaded opening through its side and a screw therein provided with a terminal drill having cutting edges.

2. A nut having a threaded opening through its side, the center of the opening coinciding with the crown of the nut thread, and a screw in said opening having a drill at its inner end provided with cutting edges.

3. The combination with a bolt and a nut therefor, of a securing screw tapped through the side of the nut and provided with a drilling terminal having cutting edges adapted to cut a socket between adjacent threads of the bolt, substantially as set forth.

4. The combination with a bolt and a nut therefor, of a securing screw tapped through the side of the nut and provided with a drilling terminal having cutting edges adapted to cut a socket between adjacent threads of the bolt, and having means for locking said screw in the nut, substantially as set forth.

In testimony whereof I hereunto affix my signature in the presence of two witnesses.

J. ADOLPH SCHMITZ.

Witnesses:
C. M. CLARKE,
FREDK. STAUB.

---

Copies of this patent may be obtained for five cents each, by addressing the "Commissioner of Patents, Washington, D. C."